(12) United States Patent
Al-Harbi et al.

(10) Patent No.: US 11,603,728 B1
(45) Date of Patent: Mar. 14, 2023

(54) LASER AND CHEMICAL SYSTEM AND METHODS FOR WELL STIMULATION AND SCALE REMOVAL

(71) Applicant: Saudi Arabian Oil Company, Dhahran (SA)

(72) Inventors: Bader Ghazi Al-Harbi, Dhahran (SA); Norah Abdullah Aljeaban, Dhahran (SA); Sameeh Issa Batarseh, Dhahran (SA)

(73) Assignee: Saudi Arabian Oil Company, Dhabran (SA)

( * ) Notice: Subject to any disclaimer, the term of this patent is extended or adjusted under 35 U.S.C. 154(b) by 0 days.

(21) Appl. No.: 17/530,170

(22) Filed: Nov. 18, 2021

(51) Int. Cl.
| | | |
|---|---|---|
| *E21B 29/02* | (2006.01) | |
| *E21B 37/06* | (2006.01) | |
| *B23K 26/40* | (2014.01) | |
| *B23K 103/00* | (2006.01) | |

(52) U.S. Cl.
CPC .............. *E21B 29/02* (2013.01); *B23K 26/40* (2013.01); *E21B 37/06* (2013.01); *B23K 2103/52* (2018.08)

(58) Field of Classification Search
CPC ....... E21B 29/02; E21B 37/106; B23K 26/40; B26K 2103/52
See application file for complete search history.

(56) References Cited

U.S. PATENT DOCUMENTS

| | | |
|---|---|---|
| 6,755,262 B2 | 6/2004 | Parker |
| 6,888,097 B2 | 5/2005 | Batarseh |
| 8,307,900 B2 | 11/2012 | Lynde et al. |
| 8,678,087 B2 | 3/2014 | Schultz et al. |
| 9,982,186 B2 | 5/2018 | Beuterbaugh et al. |
| 11,060,378 B2 | 7/2021 | De Witt et al. |
| 2013/0161007 A1* | 6/2013 | Wolfe ............... E21B 43/11857 166/63 |
| 2014/0345861 A1 | 11/2014 | Stalder et al. |
| 2015/0198022 A1 | 7/2015 | Stanecki et al. |
| 2017/0130570 A1* | 5/2017 | Al-Nakhli ............... E21B 29/02 |
| 2018/0163524 A1* | 6/2018 | Batarseh ............. E21B 43/2607 |
| 2019/0338625 A1* | 11/2019 | Othman ................... E21B 43/26 |
| 2019/0345812 A1* | 11/2019 | Aljubran ............... E21B 47/007 |
| 2020/0102870 A1 | 4/2020 | Yesumali et al. |
| 2020/0392824 A1 | 12/2020 | Batarseh et al. |

FOREIGN PATENT DOCUMENTS

| | | |
|---|---|---|
| CN | 203081295 U | 7/2013 |
| CN | 203334954 U | 12/2013 |

* cited by examiner

*Primary Examiner* — Christopher J Sebesta
(74) *Attorney, Agent, or Firm* — Bracewell LLP; Constance G. Rhebergen; Eleanor L. Tyson

(57) ABSTRACT

Systems and methods for delivering an injection fluid into a subterranean well include an injection tool having an injection tool body with an internal cavity. A fluid chamber is located within the internal cavity. A heating chamber includes a pipe segment arranged parallel to the central axis. A one way valve provides a fluid flow path for the injection fluids to travel in a downhole direction through the one way valve, and prevents the flow of fluids through the one way valve in an uphole direction. A fiber optic cable extends to the pipe segment, the fiber optic cable operable to deliver a laser radiation to the pipe segment, heating the pipe segment. The injection tool body provides a fluid flow path from the one way valve to an outside of the injection tool.

16 Claims, 3 Drawing Sheets

US 11,603,728 B1

LASER AND CHEMICAL SYSTEM AND METHODS FOR WELL STIMULATION AND SCALE REMOVAL

BACKGROUND OF THE DISCLOSURE

1. Field of the Disclosure

The disclosure relates generally to drilling and completion of a subterranean well, and more particularly to tools and methods for downhole preheating of chemicals to be injected into the subterranean well.

2. Description of the Related Art

During the development and operation of subterranean wells, subterranean formations can be acidized in order to increase the permeability of the formation. For example, in the petroleum industry, acidizing fluid can be injected into a well in order to increase the permeability of a surrounding hydrocarbon bearing formation, thereby facilitating the flow of hydrocarbon fluids into the well from the formation.

In acid fracturing, the acidizing fluid is disposed within the well under sufficient pressure to cause fractures to form within the formation. The fractures formed by the pressure, as well as the chemical reaction of the acid within the formation, increase the permeability of the formation. Alternately, the acidizing fluid can be passed into the formation from the well at a pressure below the fracturing pressure of the formation. In such an embodiment, the permeability increase in the formation is caused primarily by the chemical reaction of the acid within the formation with little or no permeability increase being due to mechanical disruptions within the formation as in fracturing.

In addition, during production operations of the subterranean well, when water is produced with the production of hydrocarbons the water will travel to the surface with the hydrocarbons. The produced water can cause mineral scale deposition, corrosion, emulsion, and result in hydrates. The scale can be deposited all along the water path from the subterranean reservoir to the surface equipment. As an example, scale can be formed by carbonates, sulfates, and sulfides, as well as other possible scale-building matter.

SUMMARY OF THE DISCLOSURE

Embodiments of this disclosure provide systems and methods for preheating injected chemicals, including acids and chelating agents, to increase the reactivity between the chemicals and the formation rocks and hence improve the stimulation performance. Embodiments of this disclosure are particularly useful in dolomite formations. In addition, the invented tool can be used to accelerate removing the deposited scale. The reactivity between chemicals and formation rocks and scales is dependent on the temperature. The higher the temperature, the higher the dissolution power. Therefore, increasing the temperature of the injected acid will result in increased dissolution of the formation rock and scales.

The combination of high power laser and acid in embodiments of this disclosure will help create wormholes in the formation rocks and dissolve scales deposited on the tubing. The systems and methods of this disclosure can save time, reduce cost and improve production by connecting producing tunnels from the wellbore to the hydrocarbon-bearing formation. The advantage of the proposed technology is by utilizing high power laser, the injected chemicals would be pre-heated and hence accelerating the reaction and improving the well stimulation and scale removal efficiency.

In an embodiment of this disclosure, an injection tool for delivering an injection fluid into a subterranean well includes an injection tool body that is an elongated member with an internal cavity extending along a central axis. A fluid chamber is located within the internal cavity. The fluid chamber has a chamber uphole terminal end open to and in fluid communication with the internal cavity of the injection tool body. A heating chamber includes a pipe segment arranged parallel to the central axis, the pipe segment having a segment uphole end open to and in fluid communication with a chamber downhole end of the fluid chamber. A one way valve is located at a segment downhole end of the pipe segment. The one way valve provides a fluid flow path for the injection fluids to travel in a downhole direction through the one way valve. The one way valve prevents the flow of fluids through the one way valve in an uphole direction. A fiber optic cable extends to the pipe segment. The fiber optic cable is operable to deliver a laser radiation to the pipe segment, heating the pipe segment. The injection tool body has a body terminal downhole end that is open, providing a fluid flow path from the one way valve to an outside of the injection tool.

In alternate embodiments, the injection tool can further include circular optics located within the pipe segment and positioned to direct a laser beam along an inner diameter surface of the pipe segment over an axial length of the pipe segment. The pipe segment can be formed of a ceramic having activated carbon. The pipe segment can include a plurality of pipe segments arranged in parallel within the internal cavity.

In other alternate embodiments, the injection tool can further include an internal packer member circumscribing the fluid chamber and engaging an inner diameter surface of the internal cavity. An insulation chamber can be located between the pipe segment and the body terminal downhole end, the insulation chamber being an elongated tubular member having an insulating liner operable to reduce a heat loss of the injection fluid traveling through the insulation chamber.

In an alternate embodiment of this disclosure, a system for delivering an injection fluid into a subterranean well with an injection tool includes the injection tool secured to a delivery member and suspended within the subterranean well with the delivery member. The injection tool has an injection tool body that is an elongated member with an internal cavity extending along a central axis. A fluid chamber is located within the internal cavity. The fluid chamber has a chamber uphole terminal end open to and in fluid communication with the internal cavity of the injection tool body. A heating chamber includes a pipe segment arranged parallel to the central axis. The pipe segment has a segment uphole end open to and in fluid communication with a chamber downhole end of the fluid chamber. A one way valve is located at a segment downhole end of the pipe segment. The one way valve provides a fluid flow path for the injection fluids to travel in a downhole direction through the one way valve, and prevents the flow of fluids through the one way valve in an uphole direction. A fiber optic cable extends to the pipe segment. The fiber optic cable is operable to deliver a laser radiation to the pipe segment, heating the pipe segment. The injection tool body has a body terminal downhole end that is open, providing a fluid flow path from the one way valve to an outside of the injection tool. The fiber optic cable extends to a laser generation system located at an earth's surface. The delivery member is an elongated member having a central bore in fluid communication with the internal cavity of the injection tool body. The delivery member is in fluid communication with an injection fluid source at the earth's surface.

In alternate embodiments, the fiber optic cable can extend along an outer diameter surface of the injection tool body and can extend along an outer diameter surface of the delivery member. The delivery member can be a coiled tubing. The injection tool body can have a terminal uphole end secured to the delivery member.

In another alternate embodiment of this disclosure, a method for delivering an injection fluid into a subterranean well with an injection tool includes conveying the injection tool into the wellbore of the subterranean well. The injection tool has an injection tool body that is an elongated member with an internal cavity extending along a central axis. A fluid chamber is located within the internal cavity. The fluid chamber has a chamber uphole terminal end open to and in fluid communication with the internal cavity of the injection tool body. A heating chamber includes a pipe segment arranged parallel to the central axis. The pipe segment has a segment uphole end open to and in fluid communication with a chamber downhole end of the fluid chamber. A one way valve is located at a segment downhole end of the pipe segment. The one way valve provides a fluid flow path for the injection fluids to travel in a downhole direction through the one way valve. The one way valve prevents the flow of fluids through the one way valve in an uphole direction. A fiber optic cable extends to the pipe segment. The injection tool body has a body terminal downhole end that is open, providing a fluid flow path from the one way valve to an outside of the injection tool. The method further includes delivering the injection fluids to the injection tool from an injection fluid source at the earth's surface. The injection fluids are heated by delivering a laser radiation to the pipe segment through the fiber optic cable, heating the pipe segment that heats the injection fluids within the heating chamber of the injection tool, forming a heated injection fluid. The heated injection fluids are delivered from the injection tool and into the wellbore of the subterranean well.

In alternate embodiments, the step of heating the injection fluids can include heating the injection fluids with circular optics located within the pipe segment, the circular optics directing a laser beam along an inner diameter surface of the pipe segment over an axial length of the pipe segment. The pipe segment can include a plurality of pipe segments arranged in parallel within the internal cavity, and the step of heating the injection fluids can include heating the injection fluids traveling through each of the plurality of pipe segments simultaneously.

In other alternate embodiments, the method can further include actuating an internal cavity packer member to engage an inner diameter surface of the internal cavity, the internal cavity packer member circumscribing the fluid chamber. An insulation chamber can be located between the pipe segment and the body terminal downhole end, the insulation chamber being an elongated tubular member having an insulating liner, and the method can further include reducing a heat loss of the injection fluid traveling through the insulation chamber with the insulating liner.

In yet other alternate embodiments, conveying the injection tool into the wellbore can include securing the injection tool to a delivery member and suspending the injection tool within the subterranean well with the delivery member. The delivery member can be an elongated member having a central bore in fluid communication with the internal cavity of the injection tool body, and the method can further include delivering the injection fluid to the injection tool through the delivery member from an injection fluid source at the earth's surface. A laser beam can be generated with a laser generation system located at an earth's surface and the laser beam can be transmitted through the fiber optic cable for delivering the laser radiation to the pipe segment.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
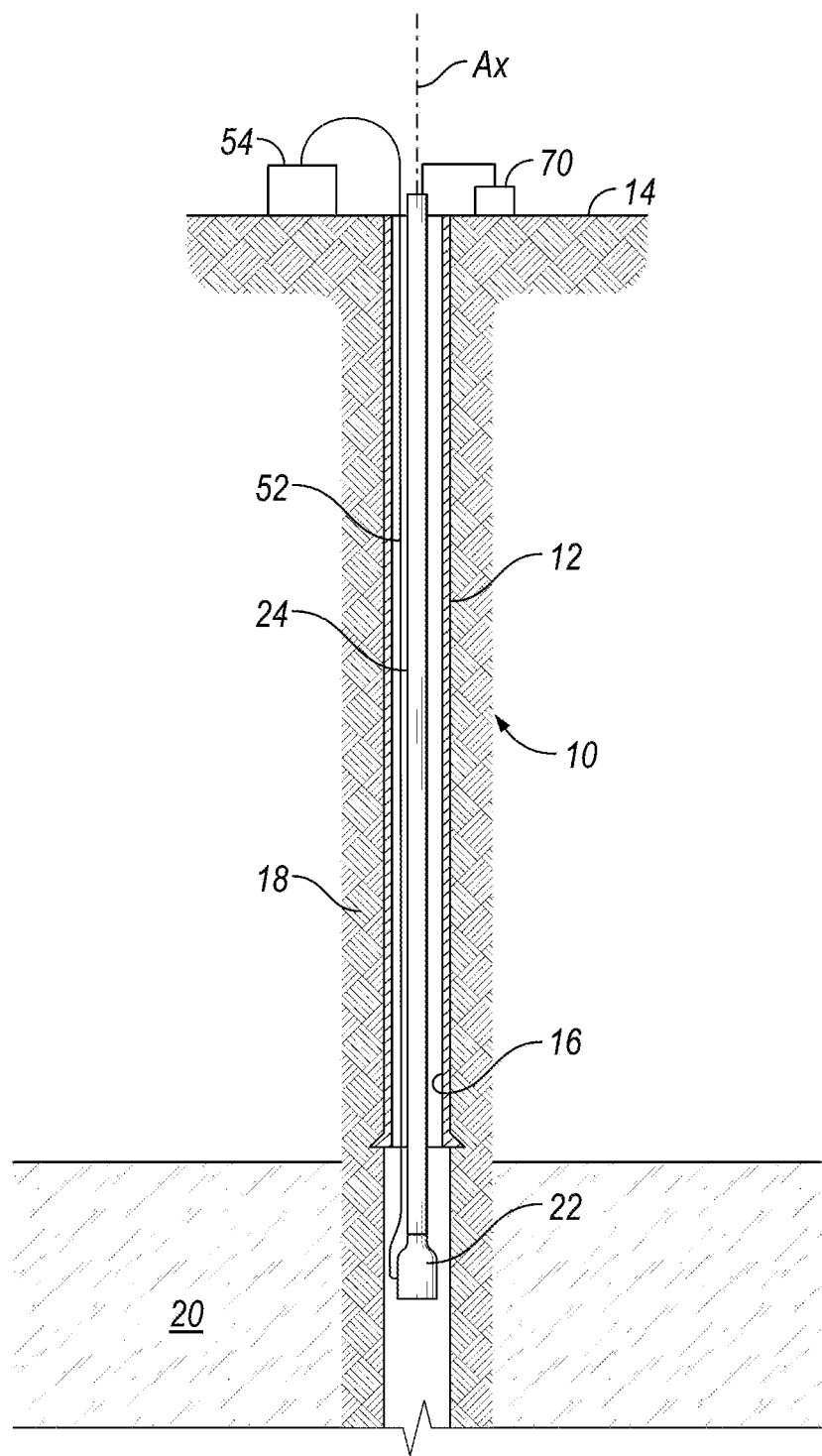
FIG. 1 is a schematic partial section elevation view of a subterranean well having an injection tool, in accordance with an embodiment of this disclosure.

Referring to FIG. 1, subterranean well 10 can have wellbore 12 that extends from an earth's surface 14. Subterranean well 10 can be an offshore well or a land based well and can be a well associated with hydrocarbon development operations, such as, for example, a hydrocarbon production well, an injection well, or a water well. Wellbore 12 can be drilled from surface 14 and into and through various subterranean formations. Subterranean well 10 can have a longitudinal axis, Ax. In the example embodiment of FIG. 1, subterranean well 10 is shown as extending generally vertically from surface 14. In alternate embodiments, subterranean well 10 can have a wellbore 12 that is not generally vertical relative to surface 14, such as an inclined, deviation, horizontal wellbore.

Casing 16 can line an inner diameter surface of wellbore 12. Casing 16 can be formed of a series of tubular pipe joints that are secured end to end. Casing 16 can be a tubular member that has a bore. In alternate embodiments, wellbore 12 can be uncased. Wellbore 12 can extend through subterranean formation 18.

In certain embodiments, underground formation 18 includes treatment zone 20. In examples of embodiments of this disclosure, treatment zone 20 can be formed of calcareous formations such as dolomites, limestones, dolomitic sandstones, and the like. Treatment zone 20 extends radially from wellbore 12 and is a portion of subterranean formation 18 to be treated. Treatment zone 20 could be treated, for example, with acid and chelating agents.

In alternate embodiments, there may be no specific treatment zone. In such embodiments, wellbore 12 may receive treatments, such as treatments for scale removal performance that can be delivered into various locations along wellbore 12, including within regions of wellbore 12 where there is casing 16 and other tubular members that extend through wellbore 12.

Injection tool 22 can be delivered into wellbore 12 with delivery member 24. Injection tool 22 can be secured to delivery member 24, and can be suspended within subterranean well 10 by delivery member 24. Delivery member 24 can be, for example, a coiled tubing, drilling string, or other tubular member.

Figure 2:
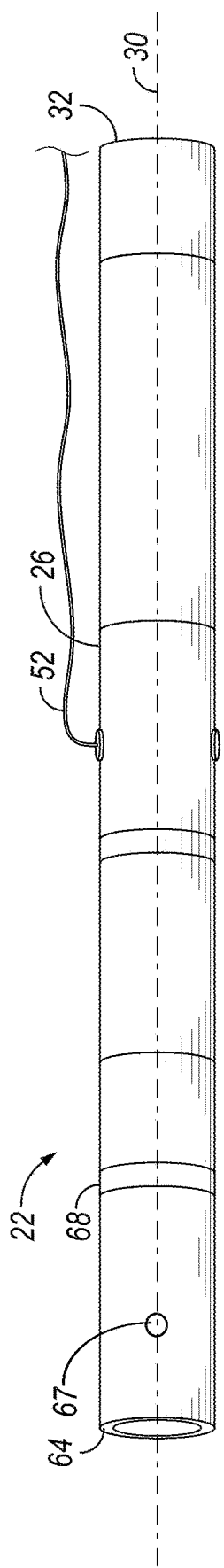
FIG. 2 is a perspective view of an injection tool, in accordance with an embodiment of this disclosure.
Figure 3:
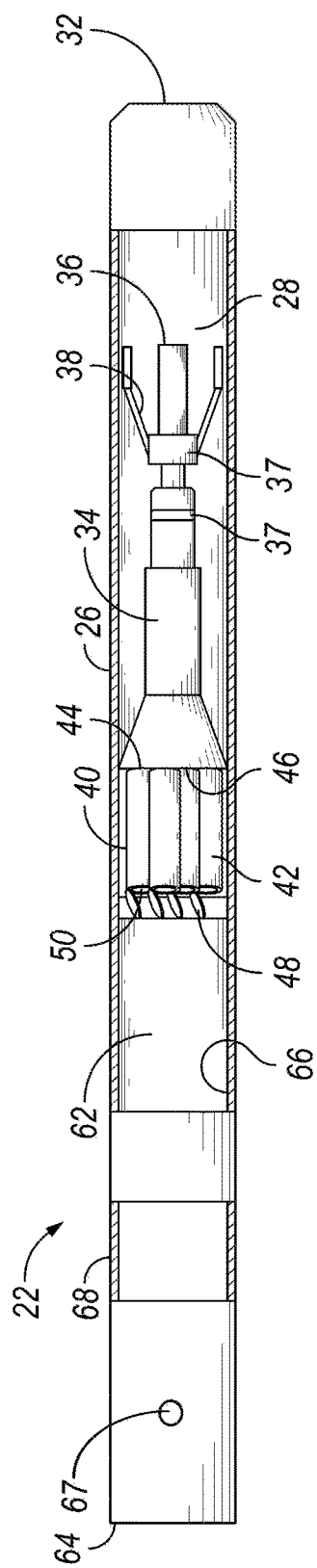
FIG. 3 is a section view of the injection tool of FIG. 2.
Figure 4:
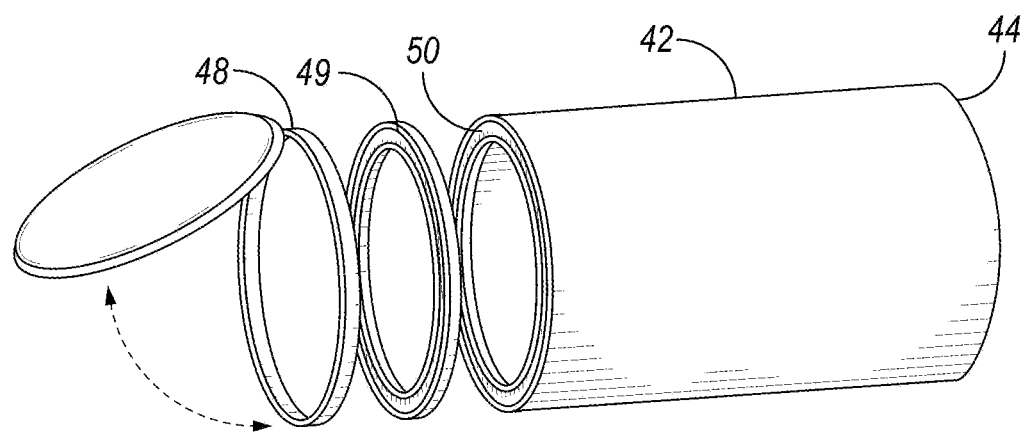
FIG. 4 is a perspective view of one way valve of an injection tool, in accordance with an embodiment of this disclosure.

Looking as FIGS. 2 and 3, injection tool 22 includes injection tool body 26 that is an elongated member with an internal cavity 28 extending along central axis 30. Injection tool body 26 can be cylindrical shaped. Injection tool body 26 has terminal uphole end 32 that can be secured to delivery member 24 (FIG. 1).

Injection tool 22 further includes fluid chamber 34. Fluid chamber 34 is located within internal cavity 28 of injection tool 22. Fluid chamber 34 is elongated tubular member with a central bore. Fluid chamber 34 can have a varied outer diameter dimension and a varied inner diameter dimension. In the example embodiment of FIG. 3, fluid chamber 34 has a smaller outer diameter region uphole of a larger outer diameter region.

Fluid chamber 34 has chamber uphole terminal end 36. Chamber uphole terminal end 36 is open to and in fluid communication with internal cavity 28. Chamber uphole terminal end 36 therefore provides a fluid flow path for injection fluids traveling through internal cavity 28 of injection tool body 26 to flow into fluid chamber 34. The volume of the injected fluid is predetermined prior the injection. The pressure, rate and the volume of the injected fluid are controlled from the surface.

Internal packer member 38 circumscribes fluid chamber 34. Internal packer member 38 can be actuated to engage an inner diameter surface of internal cavity 28, as shown in the example embodiment of FIG. 3. Internal packer member 38 can stabilize fluid chamber 34 within internal cavity 28.

Internal packer member 38 can further sealingly engage the inner diameter surface of internal cavity 28. In such an embodiment, internal packer member 38 blocks the flow of fluid, including the flow of injection fluid, through an annular space of internal cavity 28 defined between an outer diameter surface of fluid chamber 34 and the inner diameter surface of internal cavity 28 past internal packer member 38. With internal packer member 38 actuated, fluids traveling in a downhole direction through internal cavity 28 will therefore all be directed through chamber uphole terminal end 36 and into fluid chamber 34.

Connector members 37 can be used to join together parts of injection tool 22. As an example, a connector member 37 can be used to connect internal packer member 38 to fluid chamber 34. Another connector member 37 can be used to connect together the parts of fluid chamber 34. Connector member 37 can be used to separate parts of injection tool 22 for maintenance, repair, or replacement of such parts of injection tool 22.

Injection tool 22 further includes heating chamber 40. Heating chamber 40 includes pipe segment 42. Pipe segment 42 is a tubular member arranged within injection tool body 26 parallel to central axis 30 of tool body 26. Pipe segment 42 has segment uphole end 44 that is open to, and in fluid communication with, chamber downhole end 46 of fluid chamber 34. Chamber downhole end 46 is an open terminal downhole end of fluid chamber 34. Fluids, including injection fluids, that are traveling in a downhole direction within injection tool 22 therefore will pass through fluid chamber 34 and into heating chamber 40.

In embodiments of this disclosure, pipe segment 42 is formed of a ceramic. Pipe segment 42 can alternately include activated carbon. As is further discussed, such ceramic material is conducive to being heated by laser radiation. In embodiments of this disclosure, heating chamber includes a plurality of pipe segments 42. In such an embodiment each of the pipe segments 42 is arranged in parallel within internal cavity 28 of injection tool body 26. Each of the pipe segments 42 are arranged parallel to central axis 30.

One way valve 48 provides a fluid flow path for fluids, including the injection fluids, to travel in a downhole direction through one way valve 48. One way valve 48 prevents the flow of fluids, including injection fluids, through one way valve 48 in an uphole direction. One way valve 48 therefore prevents the flow of fluids, including injection fluids, into the segment downhole end 50 of pipe segment 42 in an uphole direction, protecting injection tool 22 from backflow.

Looking at FIG. 1, injection tool 22 further includes fiber optic cable 52. Fiber optic cable 52 extends to pipe segment 42. In an embodiment with a plurality of pipe segments 42, fiber optic cable 52 extends to each pipe segment 42. Fiber optic cable 42 can deliver laser radiation to pipe segment 42, heating pipe segment 42.

Fiber optic cable 52 can extend to laser generation system 54 at earth's surface 14. In the example embodiments of FIGS. 1 and 2, fiber optic cable 52 extends along an outer diameter surface of tool body 26 and extends along an outer diameter surface of delivery member 24. Laser generation system 54 generates the laser beam that is transmitted through fiber optic cable 52 to produce the laser radiation that is delivered to pipe segment 42. Laser generation system 54 can include a high powered laser that is capable of delivering the laser beam to fiber optic cable 52.

Figure 5:
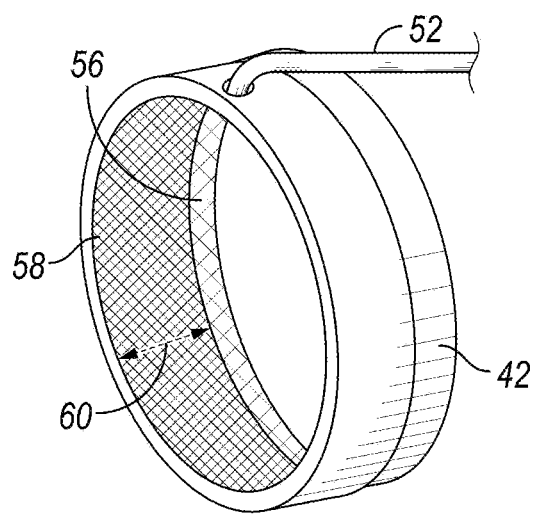
FIG. 5 is a perspective view of a circular laser beam of an injection tool, in accordance with an embodiment of this disclosure.

Looking at FIG. 5, circular optics 56 are shown schematically and are located within pipe segment 42. Circular optics 56 are positioned to direct a circular laser beam 58 along an inner diameter surface of pipe segment 42 over an axial length 60 of pipe segment 42. The laser radiation generated by circular laser beam 58 heats pipe segment 42, which in turn heats injection fluids that are within pipe segment 42, forming a heated injection fluid. In embodiments with a plurality of pipe segments 42, each pipe segment 42 is heated by a separate circular laser beam 58 simultaneously.

Looking at FIG. 3, injection tool 22 further includes insulation chamber 62. Insulation chamber 62 is located axially between pipe segment 42 and body terminal downhole end 64 of injection tool body 26. Insulation chamber 62 is an elongated tubular member having an insulating liner 66. Insulating liner 66 can reduce a loss of heat of the heated injection fluid that is traveling through insulation chamber 62. In particular, the heated injection fluid will be at a higher temperature than the fluid exterior of injection tool body 26. Insulating liner 66 will reduce the transfer of heat from the heated injection fluid within insulation chamber 62 and the wall of insulation chamber 62 or fluids or other material exterior of insulation chamber 62.

Terminal downhole end 64 of injection tool body 26 can be closed. Nozzle 67 extends through a sidewall of injection tool body 26. Nozzle 67 provide a fluid flow path from one way valve 48 to an outside of injection tool 22. After the heated injection fluid exits one way valve 48 and passes through insulation chamber 62, the heated injection fluid exits injection tool 22 through nozzle 76 of injection tool body 26. Injection tool body can include a number of nozzles 67 oriented in various directions, with the number of nozzles and the orientation of the nozzles being selected to meet the operational requirements of injection tool 22.

In an example of operation, injection tool 22 can be used to deliver an injection fluid into subterranean well 10. Injection tool 22 is conveyed into wellbore 12 of subterranean well 10 with delivery member 24. Injection tool 22 can be secured to delivery member 24 and delivery member 24 can suspend injection tool 22 within subterranean well 10. Injection tool 22 can be conveyed into subterranean well 10 to inject a fluid into wellbore 12. As an example, injection tool 22 can be used to deliver and acid, or to deliver a fluid for accelerating the removal of deposited scale.

Injection tool 22 can include sensor module 68. Sensor module 68 can have logging equipment or various sensors to identify the target region of the wellbore. Sensor module can include acoustic sensing, sonic logging, or other known sensing techniques to determine the position of injection tool 22 relative to the target region of wellbore 12. In certain embodiment, the target region of wellbore 12 could be treatment zone 20. In alternate embodiments, the target region of wellbore 12 could be a region to be subjected with a scale treatment fluid, or other region of wellbore 12 to be treated with an injection fluid that is delivered by injection tool 22.

After injection tool 22 has been delivered to the target region of wellbore 12, the injection fluids can be delivered to injection tool 22. The injection fluids can be delivered to injection tool 22 from injection fluid source 70 that is located at earth's surface 14. Delivery member 24 is an elongated member having a central bore in fluid communication with the internal cavity 28 of injection tool body 26. Injection fluids can therefore be delivered from injection fluid source 70, through the central bore of delivery member 24, and into internal cavity 28 of injection tool 22.

The injection fluids can travel into and through fluid chamber 34 to reach pipe segment 42 of heating chamber 40. Heating chamber 40 can be heated by laser radiation that is delivered as a laser beam from laser generation system 54 to pipe segment 42 through fiber optics cable 52. The injection fluids within pipe segment will in turn be heated by the increase in temperature of pipe segment 42 to form heated injection fluid. The heated injection fluid can then be delivered into wellbore 12 through body terminal downhole end 64 of injection tool body 26.

In an example embodiment of this disclosure, pipe segment 42 is formed of ceramic pipes containing activated carbon. Such pipes increase in temperature when exposed to laser radiation. As an example, such pipes can reach a temperature of 1700 degrees Celsius after a minute of heating the pipe with a laser beam. In such an example, laser generation system 54 generates a laser with a power of 1 kW, and an axial length 60 of the laser being for heating the pipe is one inch.

The resulting temperature of pipe segment 42 can be controlled by controlling the power of the laser beam. As an example, to reduce the temperature of pipe segment 42, the power of laser generation system 54 can be reduced. In addition, the intensity of the laser beam can be reduced by increasing the beam size, which will reduce the temperature increase of pipe segment 42.

In example embodiments, the injection fluid is an acid that will either be injected into treatment zone 20, or used to remove scales. The reactivity between the injection fluid and formation rocks or scales is dependent on the temperature of the injection fluid. The higher the temperature of the injection fluid, the higher the dissolution power.

The acid of the injection fluid will react with the formation of treatment zone 20 and create conductive wormholes or fracturing networks. In carbonate formations several acids can be used such as Hydrochloric acid (HCl) according to equation (1), Organic acids including but not limiting to formic acid, acetic acid and methanosulphonic acid and chelating agents such as Ethylenediaminetetraacetic acid (EDTA) and tetrasodium glutamate diacetate (GLDA). Treatment zone 20 can be formed, for example, of calcareous formations such as dolomites, limestones, dolomitic sandstones, and the like. In where embodiments the acid of the injection fluid is used to remove scales, the scales can include conventional scales such as calcium carbonate, and sulphide scales such as iron sulphide.

In sandstone formation the HCl, organic acids and chelating agents can dissolve the calcite cementing material according to equation (1).

$$2HCl + CaCO_3 \rightarrow CaCl_2 + CO_2 + H_2O \qquad \text{Equation (1)}$$

Preheating the injected chemicals including acids and chelating agents to increase the reactivity between the chemicals and the formation rocks and hence improve the stimulation performance and accelerate the removal of scale.

Embodiments of this disclosure therefore provide systems and methods for improving perforation operations and stimulated reservoir volumes. The methods of this disclosure are non-damaging to the formation and can be used to increase the reach in a range of hydrocarbon zones.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. An injection tool for delivering an injection fluid into a subterranean well, the injection tool including:
    an injection tool body that is an elongated member with an internal cavity extending along a central axis;
    a fluid chamber located within the internal cavity, the fluid chamber having an chamber uphole terminal end open to and in fluid communication with the internal cavity of the injection tool body;
    a heating chamber, the heating chamber including a pipe segment arranged parallel to the central axis, the pipe segment having a segment uphole end open to and in fluid communication with a chamber downhole end of the fluid chamber;
    a one way valve located at a segment downhole end of the pipe segment, the one way valve providing a fluid flow path for the injection fluids to travel in a downhole direction through the one way valve, and preventing the flow of fluids through the one way valve in an uphole direction;
    a fiber optic cable extending to the pipe segment, the fiber optic cable operable to deliver a laser radiation to the pipe segment, heating the pipe segment; where
    the injection tool body has a body terminal downhole end that is open, providing a fluid flow path from the one way valve to an outside of the injection tool; and
    an insulation chamber located between the pipe segment and the body terminal downhole end, the insulation chamber being an elongated tubular member having an insulating liner operable to reduce a heat loss of the injection fluid traveling through the insulation chamber.

2. The injection tool of claim 1, further including circular optics located within the pipe segment and positioned to direct a laser beam along an inner diameter surface of the pipe segment over an axial length of the pipe segment.

3. The injection tool of claim 1, where the pipe segment is formed of a ceramic having activated carbon.

4. The injection tool of claim 1, where the pipe segment includes a plurality of pipe segments arranged in parallel within the internal cavity.

5. The injection tool of claim 1, further including an internal packer member circumscribing the fluid chamber and engaging an inner diameter surface of the internal cavity.

6. A system for delivering an injection fluid into a subterranean well with an injection tool, the system including:
    the injection tool secured to a delivery member and suspended within the subterranean well with the delivery member, the injection tool having:
        an injection tool body that is an elongated member with an internal cavity extending along a central axis;
        a fluid chamber located within the internal cavity, the fluid chamber having an chamber uphole terminal end open to and in fluid communication with the internal cavity of the injection tool body;
        a heating chamber, the heating chamber including a pipe segment arranged parallel to the central axis, the pipe segment having a segment uphole end open to and in fluid communication with a chamber downhole end of the fluid chamber;
        a one way valve located at a segment downhole end of the pipe segment, the one way valve providing a fluid flow path for the injection fluids to travel in a downhole direction through the one way valve, and preventing the flow of fluids through the one way valve in an uphole direction; and
        a fiber optic cable extending to the pipe segment, the fiber optic cable operable to deliver a laser radiation to the pipe segment, heating the pipe segment; where
        the injection tool body has a body terminal downhole end that is open, providing a fluid flow path from the one way valve to an outside of the injection tool;
        an insulation chamber located between the pipe segment and the body terminal downhole end, the insulation chamber being an elongated tubular member having an insulating liner operable to reduce a heat loss of the injection fluid traveling through the insulation chamber;
        the fiber optic cable extends to a laser generation system located at an earth's surface;
        the delivery member is an elongated member having a central bore in fluid communication with the internal cavity of the injection tool body; and
        the delivery member is in fluid communication with an injection fluid source at the earth's surface.

7. The system of claim 6, where the fiber optic cable extends along an outer diameter surface of the injection tool body and extends along an outer diameter surface of the delivery member.

8. The system of claim 6, where the delivery member is a coiled tubing.

9. The system of claim 6, where the injection tool body has a terminal uphole end secured to the delivery member.

10. A method for delivering an injection fluid into a subterranean well, with an injection tool, the method including:
    conveying the injection tool into the wellbore of the subterranean well, the injection tool having:
        an injection tool body that is an elongated member with an internal cavity extending along a central axis;
        a fluid chamber located within the internal cavity, the fluid chamber having an chamber uphole terminal end open to and in fluid communication with the internal cavity of the injection tool body;
        a heating chamber, the heating chamber including a pipe segment arranged parallel to the central axis, the pipe segment having a segment uphole end open to and in fluid communication with a chamber downhole end of the fluid chamber;
        a one way valve located at a segment downhole end of the pipe segment, the one way valve providing a fluid flow path for the injection fluids to travel in a downhole direction through the one way valve, and preventing the flow of fluids through the one way valve in an uphole direction; and
        a fiber optic cable extending to the pipe segment; where
        the injection tool body has a body terminal downhole end that is open, providing a fluid flow path from the one way valve to an outside of the injection tool; and an insulation chamber located between the pipe segment and the body terminal downhole end, the insulation chamber being an elongated tubular member having an insulating liner, where the method includes reducing a heat loss of the injection fluid traveling through the insulation chamber with the insulating liner;

delivering the injection fluids to the injection tool from an injection fluid source at the earth's surface;

heating the injection fluids by delivering a laser radiation to the pipe segment through the fiber optic cable, heating the pipe segment that heats the injection fluids within the heating chamber of the injection tool, forming a heated injection fluid; and delivering the heated injection fluids from the injection tool and into the wellbore of the subterranean well.

11. The method of claim 10, where the step of heating the injection fluids includes heating the injection fluids with circular optics located within the pipe segment, the circular optics directing a laser beam along an inner diameter surface of the pipe segment over an axial length of the pipe segment.

12. The method of claim 10, where the pipe segment includes a plurality of pipe segments arranged in parallel within the internal cavity, and where the step of heating the injection fluids includes heating the injection fluids traveling through each of the plurality of pipe segments simultaneously.

13. The method of claim 10, further including actuating an internal cavity packer member to engage an inner diameter surface of the internal cavity, the internal cavity packer member circumscribing the fluid chamber.

14. The method of claim 10, where conveying the injection tool into the wellbore includes securing the injection tool to a delivery member and suspending the injection tool within the subterranean well with the delivery member.

15. The method of claim 14, where the delivery member is an elongated member having a central bore in fluid communication with the internal cavity of the injection tool body, and where the method further includes delivering the injection fluid to the injection tool through the delivery member from an injection fluid source at the earth's surface.

16. The method of claim 10, further including generating a laser beam with a laser generation system located at an earth's surface and transmitting the laser beam through the fiber optic cable for delivering the laser radiation to the pipe segment.

* * * * *